United States Patent [19]
Adams

[11] Patent Number: 5,974,442
[45] Date of Patent: Oct. 26, 1999

[54] COMMUNICATION TECHNIQUE FOR INTERACTIVE APPLICATIONS OVER A NETWORK WITH DELAYS

[75] Inventor: Robert Theodore Adams, Lake Oswego, Oreg.

[73] Assignee: Intel Corporation, Santa Clara, Calif.

[21] Appl. No.: 08/777,658

[22] Filed: Dec. 31, 1996

[51] Int. Cl.⁶ .............. G06F 15/16; H04L 5/14; H04L 12/00
[52] U.S. Cl. .............. 709/200; 709/205; 709/208; 709/227; 709/228; 709/237; 709/248
[58] Field of Search .............. 395/200.3, 200.32, 395/200.35, 200.38, 200.51, 200.58, 200.78, 680–684, 200.5, 200.67; 463/41–43, 18–19, 22–23; 348/13, 7–8; 709/200–205, 208, 220–222, 227–228, 232, 236–238, 248

[56] References Cited

U.S. PATENT DOCUMENTS

| | | | |
|---|---|---|---|
| 5,119,319 | 6/1992 | Tanenbaum | 395/200.35 |
| 5,386,512 | 1/1995 | Crisman et al. | 395/200.58 |
| 5,537,548 | 7/1996 | Fin et al. | 395/200.32 |
| 5,558,339 | 9/1996 | Perlman | 463/42 |
| 5,630,757 | 5/1997 | Gagin et al. | 463/43 |
| 5,664,103 | 9/1997 | Stein et al. | 395/200.35 |
| 5,685,775 | 11/1997 | Bakoglu et al. | 463/41 |
| 5,764,904 | 6/1998 | Kurashima | 395/200.38 |

*Primary Examiner*—Zarni Maung
*Assistant Examiner*—Bharat Barot
*Attorney, Agent, or Firm*—Antonelli, Terry, Stout & Kraus, LLP

[57] ABSTRACT

A method and apparatus for interactive communication between a first application program and a second application program over a network having delays. The first application program receives a message from the second application program. The message contains a previous state and one or more projected or future states of an object corresponding to the second application program. Each projected state includes a plurality of possible scenarios, each scenario including an associated probability value indicating a probability of the scenario. An updated state of the object corresponding to the second application program is determined based on the received message and displayed.

28 Claims, 6 Drawing Sheets

COMMUNICATION TECHNIQUE FOR INTERACTIVE APPLICATIONS OVER A NETWORK WITH DELAYS

BACKGROUND

The present invention relates to interactive computing. More particularly, the present invention relates to a communication technique for highly interactive applications over a network with delays.

Interactive applications are application programs which interact or communicate with each other. Examples of interactive applications includes video games, chat, and a wide variety of communications between computers. Two general classes of interactive applications include slow applications, and fast applications. Slow applications include card games, chess, chat, etc., where the minimum required response time is relatively long (i.e., several seconds). On the other hand, applications that require quick interaction from the operators and quick interaction of the objects in the game are another class of applications. These fast applications are sometimes referred to as "twitch" games because of the very quick interaction required to play them. The required response times for twitch games are measured in terms of, for example, milliseconds (i.e., 50 milliseconds). Interactive games over a network encounter latency problems when performing interactive procedures and actions. While latency is not a problem for slow applications being played interactively across a network, such as chess or chat, latency can inhibit implementation of highly interactive twitch games if the delay is significant as compared to the minimum required response time for the game or application. Where latency is significant, highly interactive twitch games are impractical because applications only receive historical game information rather than current or real-time information.

Therefore, there exists a need for a communication technique that allows highly interactive twitch games or fast application programs to interact over a network having delays.

SUMMARY OF THE INVENTION

The communication technique of the present invention overcomes the disadvantages of the prior art by transmitting messages containing information describing one or more projected or future states of an object.

In one embodiment, the present invention is a method and apparatus for interactive communication between a first and a second application programs over a network having delays. The first application program receives a message from the second application program. The message contains a previous state and one or more projected or future states of an object corresponding to the second application program, such as a vehicle being controlled by the second application program. An updated state of the object corresponding to the second application program is determined based on the received message. The updated state of the object corresponding to the second application program is displayed.

DETAILED DESCRIPTION

The Network Environment

Figure 1:
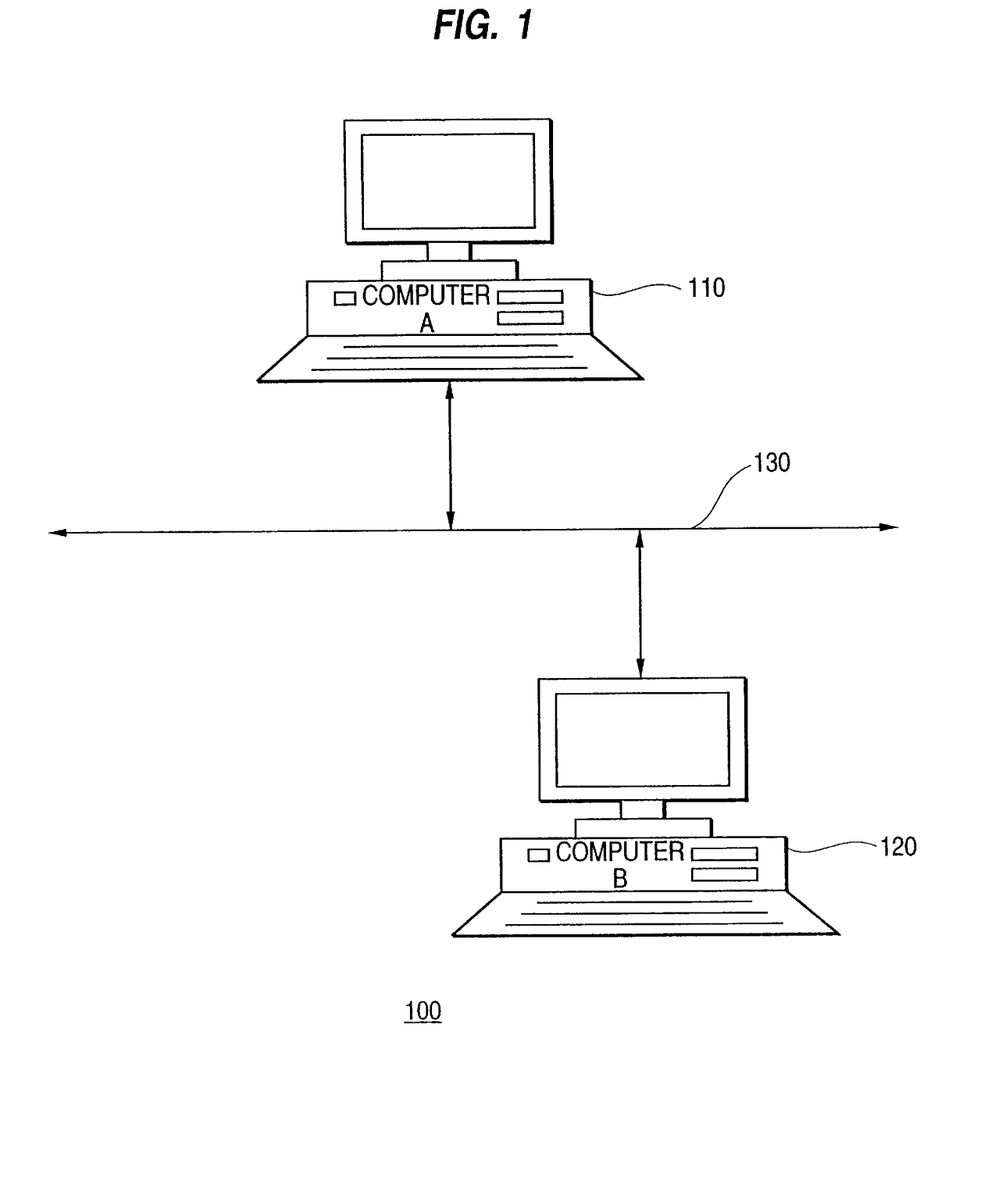
FIG. 1 illustrates a block diagram of an embodiment of a network environment, such as may be used with the present invention.

Referring to the drawings in detail, wherein like numerals indicate like elements, FIG. 1 illustrates a block diagram of a network environment, such as may be used with the present invention. Network environment 100 includes a computer A 110 and a computer B 120 coupled together via network link 130. Although not shown, it is understood that network environment 100 may comprise additional computers coupled to network link 130. Network link 130 can be any combination of any one or more of a wide variety of conventional networks, such as a local area network (LAN), a wide area network (WAN), the Internet, an Intranet, etc. The connections between computers 110 and 120 and network link 130 as well as network link 130 itself can be any of a wide variety of conventional communication media. For example, the communication media could include Ethernet cable, an Integrated Services Digital Network (ISDN) line, a plain old telephone system (POTS) line, a fiber optic line, a wireless communication medium, etc.

Figure 2:
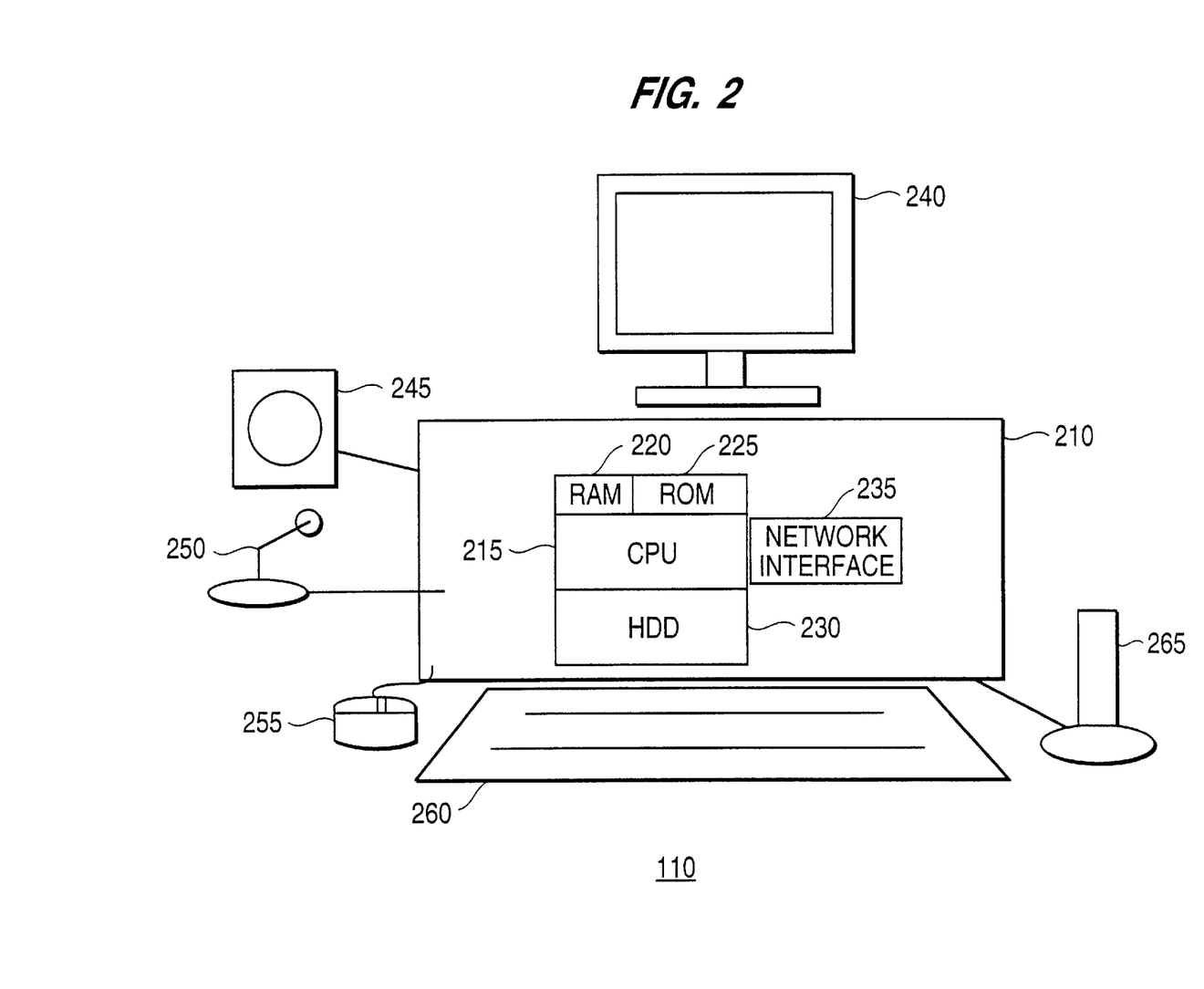
FIG. 2 is a block diagram of an embodiment of a computer, such as may be used with the present invention.

FIG. 2 is a simplified block diagram of computer A 110 according to an embodiment of the present invention. Computer A 110 is a standard personal computer and includes a computer chassis 210 housing the internal components of computer A 110. A central processing unit (CPU) 215 resides within chassis 210 for controlling the overall operation of computer A 110, and can be, for example, a Pentium® processor manufactured by Intel Corporation, Santa Clara, Calif. A random access memory (RAM) 220, a read only memory (ROM) 225, a hard disk drive (HDD) 230 and a network interface 235 are coupled to CPU 215. HDD 230 is a magnetic storage device and stores software for execution by CPU 215 including an operating system such as Windows® 95 manufactured by Microsoft Corporation, Redmond, Wash., and one or more application programs. Network interface 235 could include any standard interface for connecting computer A 110 to network link 130, such as an Ethernet card or interface, or a modem for communicating over telephone lines to an Internet service provider (ISP). Computer 110 further includes a monitor 240 for displaying information, including graphics and text, a speaker 245 for outputting audio information, a microphone 250 for receiving audio information, a mouse 255 for controlling the cursor, a keyboard 260 for inputting information, and a joystick 265 for allowing the user to input commands such as forward, reverse, left, right, etc. into computer 110. Computer B 120 includes features that are the same or similar to computer A 110.

Computers 110 and 120 each include a copy of a video game application program stored on their respective HDDs 230. The copies of the video game stored in HDD 230 include a set of game rules and procedures that instruct the computers, for example, how to interpret various messages received from the other computer(s) over the network, how to generate messages for 10 transmission, and how to interpret commands input by a user to provide a graphical display of the game on monitor 240. Users located at computers A and B (110, 120) interactively play the video game over network link 130. The video game is, for example, a highly interactive twitch game and requires quick response time between computers 110 and 120. The delay between computer A 110 and computer B 120 over network link 130 is, for example, two time units (or clock ticks). For example, each clock tick may represent 50 ms. As a result, latency is a problem for playing the video game over network link 130 because each user's computer receives only a delayed or historical view of the other user.

An Embodiment of The Game Rules and Procedures

Referring to Tables 1 and 2 and FIGS. 3–7, the game rules and procedures according to an embodiment of the present invention will now be described. The game described hereinbelow is merely illustrative. It should be understood that the present invention is applicable to a wide variety of interactive application programs or games.

In the embodiment of the video game described herein, the game is played between two computers 110 and 120 connected by network link 130.

Network link 130 introduces a delay for messages sent between the two computers. In this embodiment, network link 130 introduces a delay of two time units or clock "ticks." Other embodiments could introduce longer, shorter or variable delays.

In the game, each user controls a vehicle. Each vehicle travels along a playing field which is linear (i.e., extending along the X-axis). The playing field is 15 units long. Each user controls his vehicle using his joystick 265. Other input devices, such as mouse 255 or keyboard 260 can alternatively be used to control the vehicles. In addition, the interaction (i.e., collision) between the vehicles affects the position, speed and travel direction of each of the vehicles. The vehicles bounce off the ends of the linear playing field and off each other.

Both monitors 240 at computers 110 and 120 provide each user with a graphical representation of the playing field and of both vehicles. The is graphical representation on monitors 240 indicates the location on the playing field, the speed and the direction of travel of each of the vehicles to allow each user to play the game using his joystick 265.

In this embodiment, each vehicle has only three movement states:

1. moving forward at one unit per clock tick.
2. Moving backward at one unit per clock tick.
3. stationary (at rest)

A vehicle bouncing off of an end of the playing field reverses it's direction and maintains its speed of one unit per clock tick. A vehicle bouncing off the other vehicle transfers the action to the other vehicle. That is, two vehicles A and B collide (bounce) giving the resulting actions:

TABLE 1

| Before bounce | | After bounce | |
| --- | --- | --- | --- |
| A | B | A | B |
| forward | forward | backward | backward |
| stationary | forward | backward | stationary |
| forward | stationary | stationary | backward |

The forward direction for vehicle A corresponds to the backward direction for vehicle B. The forward direction for vehicle B is the backward direction for vehicle A. As shown in the first row of Table 1, when vehicle A which is traveling forward (i.e., from left to right) collides with vehicle B which is traveling forward (i.e., from right to left), both vehicles bounce off of each other and continue traveling at a speed of one unit per clock tick, but in the opposite directions (backwards) as before the collision. Referring to the third and last row of Table 1, when vehicle A which is traveling forward (i.e., left to right) collides with a stationary vehicle B, vehicle A becomes stationary and vehicle B travels backward (i.e., left to right) after the collision.

Each vehicle is controlled by joystick 265 that controls the vehicle with the commands:
I. move forward
II. move backward
III. no direction change For example, forwards and backwards motions on joystick 265 apply forward and backward commands respectively to the vehicle. Leaving the joystick in the neutral position indicates no direction change. The effect of these commands on the movement of the vehicle is illustrated in Table 2.

TABLE 2

| | Command | | |
| --- | --- | --- | --- |
| Vehicle Movement | Move Forward | No Direction Change | Move Backward |
| Moving Forward | Forward | Forward | Stop |
| Moving Backward | Stop | Backward | Backward |
| Stationary | Forward | Stationary | Backward |

Figure 3:
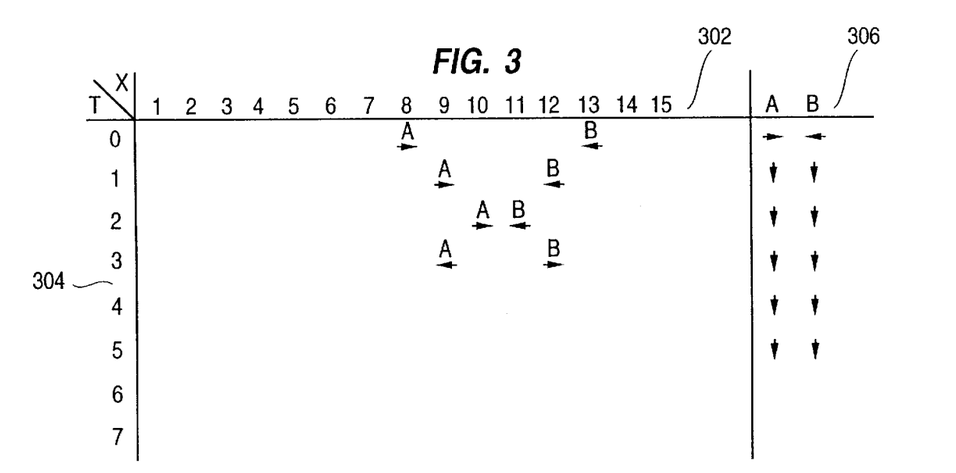
FIG. 3 illustrates an interaction between two objects according to an embodiment of the present invention.

FIG. 3 illustrates a simple interaction between the vehicle controlled by computer A 110 (vehicle A) and the vehicle controlled by computer B 120 (vehicle B) according to an embodiment of the present invention. FIG. 3 illustrates the progression from time t=0 to time t=4 (clock ticks) for a collision between vehicle A and vehicle B. The X-axis 302 corresponds to units along the game playing field, and extends from units 1 to 15. The t-axis 304 corresponds to time in clock ticks and extends from time 0 to 7. Letters (A or B) identify the vehicle and arrows indicate the direction of travel for the vehicle. Although not shown, a down arrow, would indicate a stationary vehicle.

The command chart 306 of FIG. 3 indicates the commands applied by each user during each clock tick. A down arrow indicates neutral or no direction change. In command chart 206, a left arrow indicates a command to move right to left at one unit per clock tick, and a right arrow indicates a command for the vehicle to move left to right.

Referring to FIG. 3, at t=0, vehicle A is located at X=8, receives a command to move forward (left to right) and is traveling forward. At time t=0, vehicle B is located at X=13, receives a command to travel forward (right to left) and is traveling forward. As noted above, both vehicles are traveling at a constant speed of one unit per clock tick. As indicated in command chart 306, at time t=1, both users place their joysticks into the neutral position, providing a command of "no direction change." The vehicles continue traveling in their respective forward directions until the vehicles collide together just after t=2. As a result of the collision, at t=3, vehicle A is located at unit 9 and is traveling backwards (from right to left) and vehicle B is located at unit 12 and is traveling backwards (from left to right). The vehicles are allowed to change direction due to the collision because the joysticks are in the neutral position.

Figure 4:
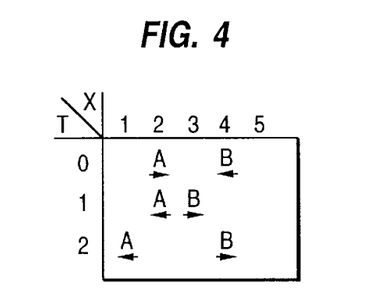
FIG. 4 is a diagram illustrating some rules for interaction between objects according to an embodiment of the present invention.
Figure 5:
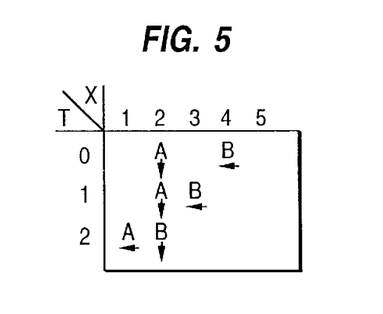
FIG. 5 is another diagram illustrating some rules for interaction between objects according to an embodiment of the present invention.

FIGS. 4 and 5 illustrate additional game rules of interaction for vehicles A and B according to an embodiment of the invention. Referring to FIG. 4, two vehicles cannot occupy the same unit on the playing filed at the same time. At time t=0, vehicle A is at unit 2 traveling in the forward direction (left to right) and vehicle B is at unit 4 traveling in the forward direction (right to left). At time t=1, both vehicles collide together, and vehicle B "wins" the collision and occupies unit 3 and is thereafter traveling in the backward direction (left to right). At time t=1, vehicle A is at unit 2 and is traveling in the backward direction (right to left).

Referring to FIG. 5, if a moving vehicle hits a stationary vehicle, the moving vehicle becomes stationary at the unit where the stationary vehicle was located, and the stationary vehicle is propelled by the collision. In FIG. 5, at time t=0, vehicle A is stationary at unit 2, and vehicle B is at unit 4 and traveling in the forward direction. At t=1, vehicle B is at unit 3 and still traveling in the forward direction. Right after t=1, vehicle B collides with stationary vehicle A at unit 2. Thereafter, at time t=2, vehicle B is stationary at unit 2 and vehicle A is located at unit 1 and propelled in the backward direction (right to left) due to the collision.

Messages

Each clock tick, computer A 110 transmits a message over network link 130 to the other computers. The message contains the current state of the object or objects being controlled by the user of computer A 110 and the likely or probable states of the object or objects in the future as estimated by computer A 110. In the game described herein, the current state would include a plurality of parameters describing the current state of vehicle A, such as, the current position (at time T=0) of vehicle A, the current direction of travel of vehicle A (if not stationary), and the current speed of vehicle A. Other parameters could be included, such as a rate of acceleration of vehicle A and other information describing vehicle A.

The information describing projected or future states contained in the message for the game described herein would include a plurality of projected or future parameters, such as the projected position, the projected direction of travel, and the projected speed of vehicle A at one or more future points in time (i.e., for time t=1, 2, 3). Each of these projected parameters could be represented as a single most probable (or certain) value, such as a position at three units, or a forward direction, or a speed of two units per clock tick. Alternatively, the projected or future parameters for an object could be represented as a fuzzy value comprising several possible values, with each possible value including an associated numerical value indicating the probability or likelihood of each value or scenario occurring.

Figure 6:
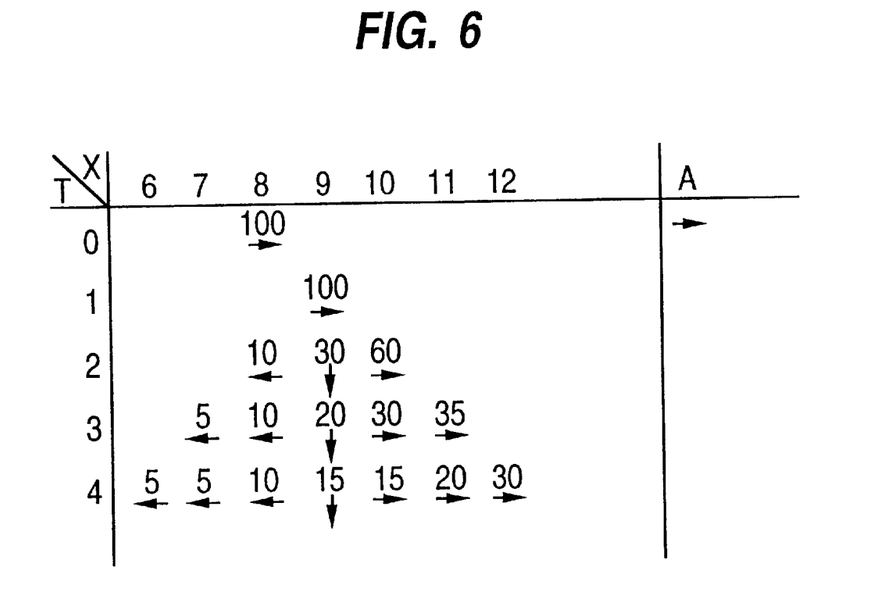
FIG. 6 illustrate a probability matrix according to an embodiment of the present invention.

FIG. 6 illustrates a probability matrix that is transmitted as a message at time t=0 from computer A 110 via network link 130 to the other computers playing the game according to an embodiment of the present invention. The probability matrix of FIG. 6 includes both the current state (for t=0) and the projected or future states of vehicle A for several future points in time (for t=1, 2, 3, 4). The message of FIG. 6 indicates that at time t=0 (current time), vehicle A is located at unit 8, traveling in the forward direction (left to right), and the command input by computer A's joystick 265 is a command to travel forward. At the future time t=1, the message indicates that vehicle A will be at unit 9 and traveling forward. For example, at t=0, because vehicle A was at unit 8 and traveling forward and the command input was to travel forward, the game rules and procedures indicate that vehicle A will be located at the next unit (unit 9) and still traveling forward at time T=1. However, the commands, if any, which will be input by the user at time t=1 are unknown.

At the future time t=2, computer A 110 determines that there are three possible scenarios for vehicle A: Vehicle A could be at unit 8 and traveling in the backward direction because, for example, it is possible that the user will input a travel backward command immediately after t=0, thereby reversing the direction of travel of vehicle A by t=2. However, the game rules and procedures indicate that this is unlikely and therefore, computer A 110 indicates that there is only a 10% probability that this scenario would occur. As a second possible scenario at t=2, vehicle A could also be at unit 9 in a stationary position because the user could have used joystick 265 to input a brief backward command to stop vehicle A. According to the game rules and procedures, computer A 110 has assigns a 30% probability for this scenario at t=2. As a third possible scenario at T=2, vehicle A could be at unit 10 and traveling forward because the joystick could be in the neutral position or remain in the forward position, thereby permitting vehicle A to continue traveling in the forward direction. This is the most likely position and direction of travel for vehicle A at t=2 and therefore, computer A 110 has assigned a 60% probability for this third scenario.

Similarly, the probability matrix of FIG. 6 indicates possible future positions, directions of travel and a number indicating the probability or likelihood of each scenario for future times t=3 and t=4. The future states of vehicle A depend upon the current statue of vehicle A, current and future commands input by the user to control vehicle A, and interaction (such as collisions) between vehicle A and other vehicles in the playing field. As a result, the projected states of vehicle A are more uncertain at each subsequent clock tick than at previous clock ticks.

Figure 7:
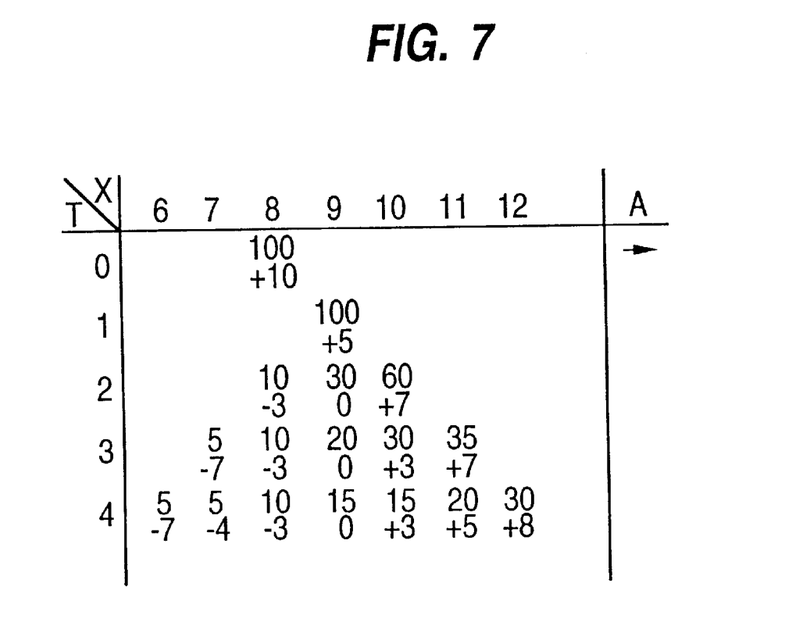
FIG. 7 illustrate another probability matrix according to an embodiment of the present invention.

FIG. 7 illustrates a probability matrix that is transmitted as a message at time t=0 from computer A 110 via network link 130 to the other computers playing the game according to another embodiment of the present invention. The probability matrix of FIG. 7 is similar to the matrix of FIG. 6 but includes an additional parameter (speed). According to the embodiment of FIG. 7, each vehicle travels at a variable speed, rather than the fixed speed of one unit per clock tick shown in the embodiment of FIG. 6. In the probability matrix of FIG. 7, the speed of vehicle A is indicated by the lower number in each box, the direction of travel is indicated by the plus sign (+) or − minus sign (−) in front of the lower number, and the upper number indicates the probability or likelihood of each entry or scenario occurring. A plus sign indicates the forward direction and the minus sign indicates the backward direction.

An Example of Playing the Game Over a Network

Figure 8:
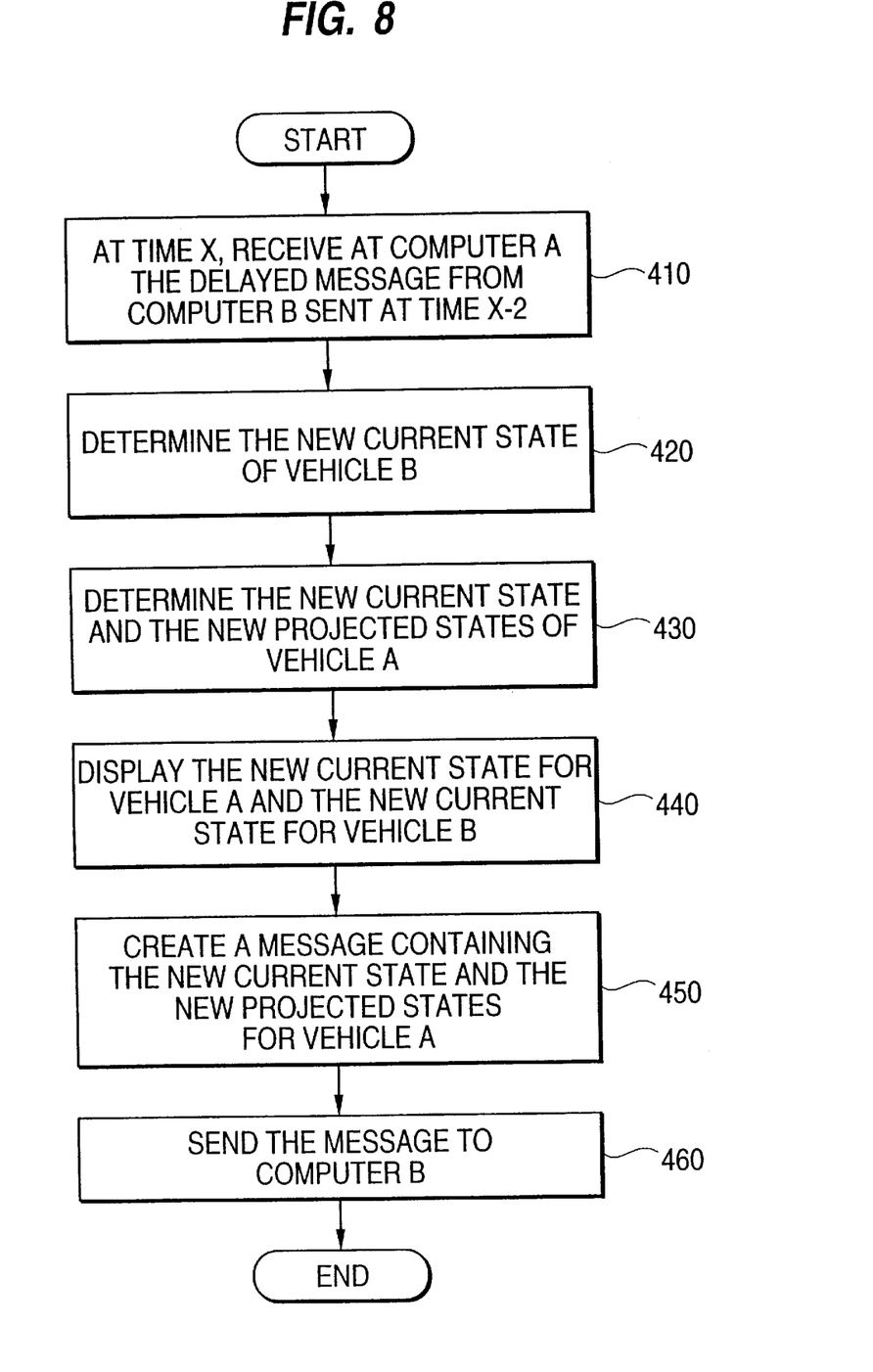
FIG. 8 is a flow chart which may be performed by a computer according to an embodiment of the present invention.

FIG. 8 is a flow chart of the operation of computer A 110 when the game is played over network link 130 between computer A 110 and computer B 120 according to an embodiment of the present invention. Every clock tick, computer A 110 and computer B 120 each generates and transmits a message to the other computers to permit users to play a highly interactive game or cooperative game across network link 130 despite a network delay or latency of two clock ticks.

Some background information will be explained before the flow chart of FIG. 8 is described. During the clock tick X, computer A 110 has previously determined the state of vehicle A for clock tick t=X and previously displayed a graphical representation of the state of vehicle A for t=X on monitor 240. The known state of vehicle A at clock tick t=X can be algebraically represented as $S_{A,\ t=X}$. In addition, during time t=X, computer A 110 has previously estimated and displayed on monitor 240 a graphical representation of the state of vehicle B for time t=X. The flow chart of FIG. 8 is an embodiment of a process which is performed by computer A 110 to determine the new current state for vehicle A ($S_{A,\ t=X+1}$), to determine the new projected states for vehicle A ($S'_{A,\ t=X+2}$, $S'_{A,\ t=X+3}$, $S'_{A,\ t=X+4}$ where $S'_A$ indicates a projected state for vehicle A), and to determine or estimate a new current state for vehicle B ($S_{B,\ t=X+1}$) for display. As described above, the state or projected state of an object (such as a vehicle) can include a wide variety parameters describing the state of the vehicle at a particular time, such as vehicle position (in one or more dimensions), vehicle speed, vehicle direction of travel, rate of acceleration, an indication as to whether an object has collided or come into contact with another object and the identity of the other object, etc.

Referring to FIG. 8, during the clock tick t=X, computer A 110 receives a message which was sent from computer B 120 during the clock tick t=X−2 (two clock ticks ago), step 410. The message transmitted from computer B 120 to computer A 110 includes the known state of vehicle B at time X−2 ($S_{B,\ t=X-2}$) and the projected states of vehicle B for times t=X−1, X, and X+1 ($S'_{B,\ t=X-1}$, $S'_{B,\ t=X}$, $S'_{B,\ t=X+1}$, where $S'_B$ indicates a projected state of vehicle B). The message transmitted by computer B 120 could be in the form of a probability matrix. In addition to including the current and projected states of vehicle B, the message transmitted from computer B 120 can also include the commands input by the user of computer B 120 during the clock tick t=X−2, such as the commands input by joystick 265 (i.e.,whether joystick 265 is pressed forward, backward or in the neutral position). The commands input by the user of computer B 120 during the clock tick t=X−2 can be algebraically represented as $C_{B,\ t=X-2}$.

At step 420, computer A 110 determines the new current state of vehicle B ($S_{B,\ t=X+1}$) based on the message received from computer B during the clock tick t=X and other information. Computer A 110 may determine the current state of vehicle B in a variety of ways based on the received message, depending on the rules and procedures of the game. For example, the current position of vehicle B may be calculated as the most likely state received in the probability matrix. For example, if the probability matrix in the received message indicates that at t=X+1, there is a 70% probability that vehicle B is stationary at unit six, then computer A 110 could use this scenario as the current state of vehicle B. Alternatively, the current state of vehicle B could be calculated as the weighted average of the received values for the time or clock tick t=X+1. For example, if there is a 10% probability that vehicle B is at unit 8, a 30% probability that vehicle B is at unit 9, and a 60%probability that vehicle B is at unit 10 (at t=X+1), the new current position of vehicle B could be estimated to be (0.1(8)+0.3(9)+0.6(10))=9.5. Alternatively, the new current position of vehicle B could be maintained in the original fuzzy form which it was received, which includes multiple possible values, with each value associated with a probability.

Similarly, values can be determined for all vehicle parameters, such as speed. As with the vehicle position, the other parameter values can be determined, for example, as the most likely value, a weighted average, or can be maintained in the original fuzzy form. Other techniques may be used to determine the state of a vehicle or object based on the received information.

At step 430, computer A 110 determines the new current state for vehicle A ($S_{A,\ t=X+1}$), and the new projected states of vehicle A ($S'_{A,\ t=X+2}$, $S'_{A,\ t=X+3}$, $S'_{A,\ t=X+4}$). In one embodiment, computer A can determine the new current state of vehicle A according to the following expression:

$$S_{A,\ t=X+1} = S_{A,t=X}\ (op1)\ S_{B,\ t=X}\ (op2)\ S'_{B,\ t=X+1}\ (op3)\ C_{B,\ t=X-2}\ (op4)\ C_{A,\ T=X}. \quad \text{(Eqn. 1)}$$

Where $S_{A,\ t=X}$ and $S_{B,\ t=X}$ refer to the most recent states of vehicles A and B, respectively. $S'_{B,\ t=X+1}$ refers to the projected state vehicle B for t=X+1 (as projected by vehicle B one or more clock ticks ago). $C_{B,\ t=X-2}$ refers to the commands (such as joystick commands) input by the user of computer B 120 during the clock tick t=X−2, and $C_{A,\ t=X}$ refers to the commands input by the user of computer A 110 during the clock tick t=X. The operators (op1), (op2), (op3) and (op4) are operators that define the interaction between vehicles based on, for example, past and current vehicle states (i.e., speed, position, direction of travel) and command inputs in accordance with the rules and procedures of the game. Eqn. 1 can be rewritten as:

$$S_{A,\ t=X+1} = f(S_{A,\ t=X},\ S_{B,\ t=X},\ S'_{B,\ t=X+1},\ C_{B,\ t=X-2},\ C_{A,\ t=X}) \quad \text{(Eqn. 2)}.$$

Eqn. 2 illustrates that the new current state for vehicle A ($S_{A,\ t=X+1}$) is a function of the previous state of vehicle A ($S_{A,\ t=X}$) the previous state of vehicle B ($S_{B,\ t=X}$) the projected state of vehicle B for the new clock tick ($S'_{B,\ t=X+1}$), the commands input to computer A 110 during the last clock tick ($C_{A,\ t=X}$), and the last known commands that were input to computer B 120 ($C_{B,\ t=X-2}$) as interpreted in accordance with the rules and procedures for the game.

Similarly one or more projected states of vehicle A can be determined, for example, based on the expressions:

$$S'_{A,\ t=X+2} = f(S_{A,t=X},\ S_{A,\ t=X+1},\ S_{B,\ t=X},\ S'_{B,\ t=X+1},\ C_{B,\ t=X-2},\ C_{A,\ t=X}) \quad \text{(Eqn. 3)}.$$

$$S'_{A,\ t=X+3} = f(S_{A,\ t=X},\ S_{A,\ t=X+1},\ S'_{A,\ t=X+2},\ S_{B,\ t=X},\ S'_{B,\ t=X+1},\ S'_{B,\ t=X+2},\ C_{B,\ t=X+2},\ C_{A,\ t=X}) \quad \text{(Eqn. 4)}.$$

Eqns. 3 and 4 illustrate that projected states of vehicle A can be determined as a function of past states of vehicle A and vehicle B, projected states of vehicle B, other projected states of vehicle A, and the commands input into computers A and B, as interpreted in accordance with the rules and procedures of the game.

The new current state of vehicle A can be determined to be a single scenario, or may be a fuzzy scenario (value) comprising a plurality of possible scenarios, with each scenario having an associated probability. For example, if the projected state of vehicle B (S'B, t=X+1) for t=X+1 is a fuzzy value comprising a plurality of possible scenarios including a 70% probability that vehicle B will occupy a location (unit) on the playing field that would collide with vehicle A at t=X+1, then, the uncertainty or fuzziness of the state of vehicle B could be transferred to vehicle A for the new current clock tick (t=X+1). In such case, the new current state of vehicle A ($S_{A,\ t=X+1}$) could be determined to be a fuzzy value comprising a plurality of possible scenarios, with each possible scenario having an associated probability. An example of this situation is described in greater detail below in connection with FIG. 9.

In step 440 of the flow chart of FIG. 8, computer A 110 displays the new current states for vehicle A ($S_{A, t=X+1}$) and vehicle B ($S_{B, t=X+1}$) in a graphical representation on monitor 240. The graphical representation may provide, for example, a color icon or picture of the vehicle at its new location on the playing field, and having the new vehicle speed according to the new current state of the vehicle. If the new current state of either vehicle is a fuzzy value comprising, for example, a plurality of possible scenarios, the graphical representation of the vehicle on monitor 240 could include a visual or graphical indication of the different possible scenarios for the vehicle. For example, volumetric rendering, and/or lines of different color, type, shading, or darkness may be used to graphically represent the different possible locations of the vehicle on the playing field. Increased shading or darker lines may be used to indicate scenarios (i.e., vehicle locations) which are the most probable, and lighter lines or "ghosts" may be used to indicate those scenarios which are less likely to occur.

In step 450, computer A 110 creates a message containing the new current state and the projected states for vehicle A. The message can be a probability matrix or could be in a different format. In step 460, the message created by computer A 110 is transmitted to the one or more other computers playing the game over network link 130. The message can be transmitted as one or more packets, with each packet having a source identifier (identifying the sending computer) and a target identifier (identifying the target or destination computer(s)).

ComputerA 110 repeats the steps of FIG. 8 for each clock tick to indicate the new states of vehicles A and B on monitor 240, and to generate a new message to send to computer B 120 over network link 130. Similarly, computer B 120 receives messages from computer A, determines the new states for vehicle A and vehicle B and new projected states for vehicle B based on the received messages, displays the new current states on monitor 240, and creates and sends a message to computer A indicating the new current and projected states of vehicle B.

Figure 9:
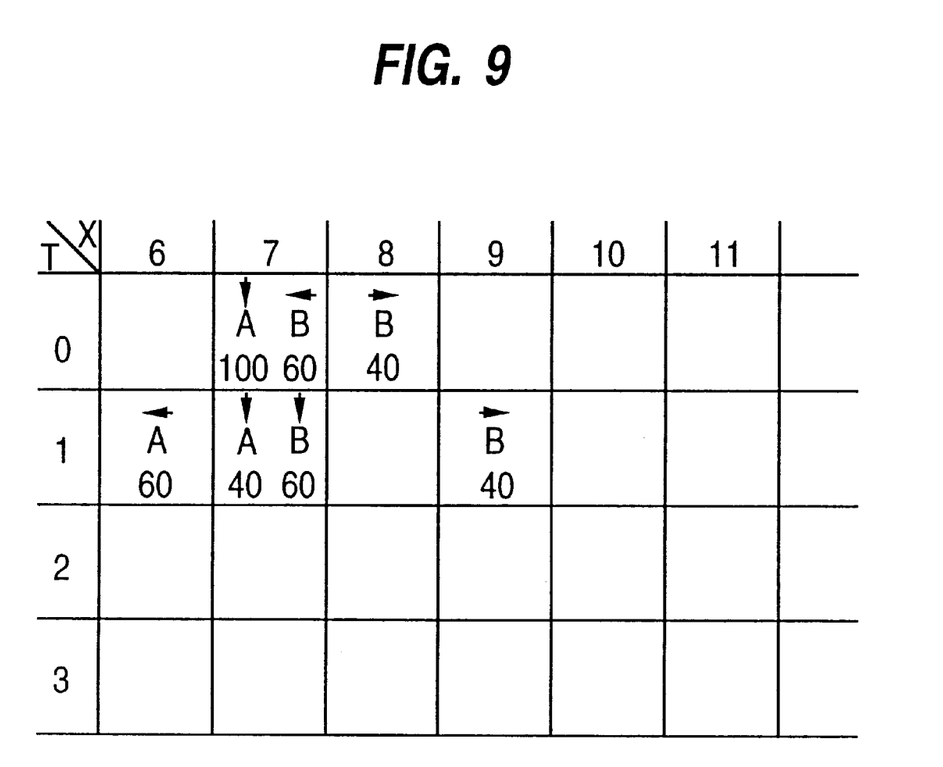
FIG. 9 illustrates a combined probability matrix for two vehicles according to an embodiment of the present invention.

FIG. 9 illustrates a combined probability matrix identifying the position, direction of travel and probability for both vehicles A and B for a past state (t=0), and for a new current state (t=1). At t=0, vehicle A is at rest at unit 7. At t=0, there is a 60% probability that vehicle B is also at unit 7 aid traveling forward (right to left), and a 40% probability that vehicle B is at unit 8 traveling backward (left to right). Computer A 110 now determines the new current position of vehicle A (for t=1). Because two vehicles cannot occupy the same space (unit) on the playing field (according to the game rules and procedures), there is a 60% probability that vehicle B collided with vehicle A at unit 7 at t=0, thereby propelling vehicle A backward and placing vehicle A at unit 6 at t=1. In the event that vehicles A and B did not collide at t=0, (there is a 40% probability of this scenario), vehicle A is still resting at unit 7.

As illustrated in the matrix of FIG. 9, vehicle B has an uncertain or fuzzy position at t=0 because there are two possible positions for vehicle B. When one of these possible positions overlaps or coincides with the certain (100%) position of vehicle A for t=0, the uncertainty (or fuzziness) of vehicle B is transferred to vehicle A, making the position of vehicle A fuzzy for the subsequent time period (t=1).

Computer A 110 can correct past vehicle errors based on new information received from computer B 120. For example, due to the delay of two ticks acrossnetwork link 130, computer A can only estimate the current (i.e., at t=0) position of vehicle B. Two ticks later (i.e., at t=2), however, computer A receives the actual position of vehicle B at t=0. As a result, computer A can correct or clarify the position (or reduce the error in the position) of vehicle B based on the new position information for vehicle B because computer A now knows where vehicle B was actually located at t=0. Similarly, computer A can clarify the position of vehicle A based on additional or updated information received from computer B regarding the the state or position of vehicle B. For example, if the position of vehicle A at t=0 is fuzzy due to a possible collision between vehicle A and vehicle B, computer A can clarify (or "defuzzify") the position of vehicle A (to a single certain state or position for t=0) two ticks later (at t=2) when computer A receives the actual position of vehicle B at the past time t=0. As a result, new state information can be used by computer A 110 to reduce or correct the past errors in vehicle states or correct a fuzzy value to a single certain value. By having a more accurate picture of past vehicle states and errors, this allows computer A 110 to more accurately determine or estimate current and future states of both vehicles A and B.

By sending and receiving messages containing current and probable future states of objects, computers A and B are each provided with an estimate of the current or real-time state of the game. This permits computer A 110 and computer B 120 to interactively play a fast or twitch game over a network having delays.

The above describes particular embodiments of the present invention as defined in the claims set forth below. The invention embraces all alternatives, modifications and variations that fall within the letter and spirit of the claims, as well as all equivalents of the claimed subject matter. For example, the information describing current and projected states in the message could be sent as a delta or difference measurement indicating the change from the last message. For example, the message could indicate an increase in speed by one unit per clock tick or a change in position by three units from the speed and location indicated by the last message. In addition, a third computer or a server may be employed to act as an intermediary for receiving messages and maintaining the game world based on the current and projected or future state information. Also, computers can determine or estimate projected states based on a variety of additional parameters, such as the maximum vehicle speed, rate of vehicle acceleration, vehicle inertia (i.e., how fast does a vehicle stop or slow down), etc.

While the present invention has been illustrated with reference to the game involving vehicles traveling on the one-dimensional playing field described herein, the present invention is applicable to a wide variety of interactive applications or games over a network. For example, the present invention could be applicable to a highly interactive sword game played over a network in which each computer is used to control the position of a warrior, a shield and a sword corresponding to each computer. In such an example, each computer playing the game over the network determines and transmits the current state (position, speed, acceleration, whether a collision has occurred, points acquired, result of collision, etc.) and projected or future states of each object (i.e., the warrior, the warrior's sword and the warrior's shield) corresponding to the computer. By transmitting information regarding projected or future states, the game can be played in real time despite the delay over the network. In other words, the present invention overcomes or compensates for the delay over the network by transmitting the projected or future state information.

What is claimed is:

1. A method of interactive communication between a first application program and a second application program over a network having delays, said method comprising the steps of:

receiving at the first application program a message from the second application program, said message containing a previous state and one or more projected states of an object corresponding to the second application program, each said projected state comprising a plurality of possible scenarios, each said scenario including an associated probability value indicating a probability of the scenario;

determining an updated state of the object corresponding to the second application program based on the received message; and displaying the updated state of the object corresponding to the second application program.

2. The method of claim 1 and further comprising the steps of:

determining an updated state of an object corresponding to the first application program based on the received message; and displaying the updated state of the object corresponding to the first application program.

3. The method of claim 2 and further comprising the steps of: determining one or more projected states of the object corresponding to the first application program based on the received message;

creating a message containing the updated state and the one or more projected states of the object corresponding to the first application program; and sending the created message from the first application program to the second application program.

4. The message of claim 1 wherein said step of receiving comprises the step of receiving at the first application program a message from the second application program, said message containing a previous state and one or more projected or future states of an object corresponding to the second application program and one or more commands input to the second application program to control the object corresponding to the second application program.

5. The method of claim 2 and further comprising the step of inputting to the first application program one or more commands to control the object corresponding to the first application program.

6. The method of claim 5 wherein said step of determining an updated state of an object corresponding to the first application program comprises the step of determining an updated state of the object corresponding to the first application program based on the received message and the commands input to the first application program.

7. A method of interactive communication between a first application program and a second application program over a network having delays, said method comprising the steps of:

receiving at the first application program a message from the second application program, said message containing a previous state and one or more projected or future states of an object corresponding to the second application program, each said projected state comprising a plurality of possible scenarios, each said scenario including an associated probability value indicating a probability of the scenario;

determining an updated state of an object corresponding to the first application program based on the received message; and displaying the updated state of the object corresponding to the first application program.

8. A method of interactive communication between a first application program and a second application program over a network having delays, said method comprising the steps of:

receiving at the first application program a message from the second application program, said message containing a previous state, one or more projected or future states of an object corresponding to the second application program, and one or more commands input to the second application program to control the object corresponding to the second application program, each said projected state comprising a plurality of possible scenarios, each said scenario including an associated probability value indicating a probability of the scenario;

determining an updated state of the object corresponding to the second application program based on the received message;

inputting one or more commands into the first application program to control the object corresponding to the first application program;

determining an updated state of the object corresponding to the first application program based on the received message and the one or more commands input to the first application program; and displaying the updated state of the object corresponding to the first application program and the updated state of the object corresponding to the second application program.

9. The method of claim 8 and further comprising the steps of:

determining one or more projected or future states of the object corresponding to the first application program based on the received message, one or more past states of the object corresponding to the first application program, and the one or more commands input to the first application program;

creating a message containing the updated state and the one or more projected or future states of the object corresponding to the first application program; and sending the created message from the first application program to the second application program.

10. The method of claim 8 wherein said step of determining an updated state of the object corresponding to the second application program comprises the step of selecting one of the plurality scenarios.

11. The method of claim 8 wherein said step of determining an updated state of the object corresponding to the second application program comprises the step of selecting the most probable one of said scenarios.

12. The method of claim 8 wherein said step of determining an updated state of the object corresponding to the second application program comprises the step of calculating a weighted average of the plurality of scenarios based on the probability values.

13. The method of claim 8 wherein said previous state comprises one or more from the list:

a previous position of the object corresponding to the second application program;

a previous speed of the object corresponding to the second application program; and a previous direction of travel of the object corresponding to the second application program.

14. The method of claim 8 wherein said step of displaying comprises the steps of:
   displaying on a computer display associated with the first application program a graphical representation of the updated state of the object corresponding to the first application program; and
   displaying on the computer display associated with the first application program a graphical representation of the plurality of possible scenarios for the updated state of the object corresponding to the second application program.

15. The method of claim 8 wherein said first application program comprises a copy of a video game running on a first computer, said second application program comprises a copy of said video game running on a second computer, said first and second computers coupled together via a computer network having delays, said computers interactively communicating over said computer network to permit users located at said computers to play the video game together.

16. The method of claim 15 wherein said first and second computers are coupled together via the Internet, said computers interactively communicating over the Internet to permit users located at said computers to play the video game together.

17. The method of claim 8 wherein said step of determining an updated state of an object corresponding to the first application program comprises the steps of:
   clarifying a past state of the object corresponding to the first application program based on the received message, said past state of the object corresponding to the first application being previously uncertain or fuzzy; and
   determining an updated state of the object corresponding to the first application program based on its clarified past state.

18. The method of claim 8 wherein said step of determining an updated state of an object corresponding to the second application program comprises the steps of:
   clarifying a past state of the object corresponding to the second application program based on the received message, said past state of the object corresponding to the second application being previously uncertain or fuzzy; and
   determining an updated state of the object corresponding to the second application program based on its clarified past state.

19. A first computer for interactively communicating over a network having delays with a second computer, said first computer comprising:
   a CPU;
   a memory coupled to the CPU;
   a manual input device coupled to the CPU;
   a display coupled to the CPU and adapted to display a graphical representation of one or more objects; and
   said CPU programmed to:
      receive a message from the second computer, said message containing a previous state, and one or more projected or future states of an object corresponding to the second computer, each said projected state comprising a plurality of possible scenarios, each said scenario including an associated probability value indicating a probability of the scenario;
      determine an updated state of the object corresponding to the second computer based on the received message;
      input one or more commands into the first computer using the manual input device to control an object corresponding to the first computer;
      determine an updated state of the object corresponding to the first computer based on the received message and the one or more commands input to the first computer; and
      display on said display the updated state of the object corresponding to the first computer and the updated state of the object corresponding to the second computer.

20. A computer-readable medium having stored thereon a plurality of instructions, the plurality of instructions including instructions when executed by a processor result in:
   receiving a message at a first computer from a second computer, said first and second computers being in communication over a network, said received message containing a previous state, and one or more projected states of an object corresponding to the second computer, each said projected state comprising a plurality of possible scenarios, each said scenario including an associated probability value indicating a probability of the scenario;
   determining an updated state of the object corresponding to the second computer based on the received message;
   determining an updated state of an object corresponding to the first computer based on the received message; and
   displaying the updated state of the object corresponding to the first computer and the updated state of the object corresponding to the second computer.

21. A computer-readable medium having stored thereon a plurality of instructions, the plurality of instructions including instructions when executed by a processor result in:
   receiving a message at a first computer from a second computer, said first and second computers being in communication over a network, said received message containing a previous state, and one or more projected states of an object corresponding to the second computer, each said one or more projected states comprising a plurality of possible scenarios, each said scenario including an associated probability value indicating a probability of the scenario;
   determining an updated state of the object corresponding to the second computer based on the received message;
   determining an updated state of an object corresponding to the first computer based on the received message; and
   displaying the updated state of the object corresponding to the first computer and the updated state of the object corresponding to the second computer.

22. A method of interactive communication between a first computer and a second computer, said first and second computers coupled together via a network, said method comprising the steps of:
   receiving at the first computer a first message from the second computer, said first message including information describing a projected state of an object, said projected state information including information describing a plurality of possible scenarios for said projected state, each said possible scenario including an associated probability value indicating a probability of the scenario;
   displaying a visual representation of the approximate state of the object based on the possible scenarios and the associated probability values included in the first message;

receiving at the first computer a second message from the second computer, said second message including updated state information indicating which of the possible scenarios included in the first message is correct for the state of the object; and displaying an updated visual representation of the state of the object based on the updated state information included in the second message.

23. The method of claim 22 wherein said step of displaying a visual representation of the approximate state of the object comprises the steps of:

determining which of the possible scenarios has the highest probability of occurring based on the associated probability values; and displaying a visual representation of the approximate state of the object based on the scenario having the highest probability of occurring.

24. The method of claim 22 wherein said step of displaying a visual representation of the approximate state of the object comprises the steps of:

calculating a weighted average of the possible scenarios included in the first message based on the associated probability values; and displaying a visual representation of the approximate state of the object based on the calculated weighted average.

25. The method of claim 22 wherein said step of displaying a visual representation of the approximate state of the object comprises the step of displaying a visual representation indicating each possible scenario for the state of the object based on the probability value associated with each scenario.

26. The method of claim 22 wherein said step of displaying a visual representation of the approximate state of the object comprises the step of displaying a graphical representation indicating: each possible scenario for the state of the object and the approximate probability of the scenario occurring based on the probability value associated with each scenario.

27. The method of claim 26, wherein said graphical representation indicates the possible scenario and the approximate probability of the scenario by using one or more graphical techniques selected from the group consisting of:

a) lines of different color;
b) lines of different shading or darkness, including ghost images;
c) different type of lines; and
d) volumetric rendering.

28. An apparatus for communicating over a network comprising:

means for receiving a first message, said first message including information describing a projected state of an object, said projected state information including information describing a plurality of possible scenarios for said projected state, each said possible scenario including an associated probability value indicating a probability of the scenario occurring;

means for displaying a visual representation of the approximate state of the object based on the possible scenarios and the associated probability values included in the first message;

means for receiving a second message, said second message including updated state information indicating which of the possible scenarios included in the first message is correct for the state of the object; and means for displaying an updated visual representation of the state of the object based on the updated state information included in the second message.

* * * * *